United States Patent
Lo et al.

(10) Patent No.: US 11,640,593 B2
(45) Date of Patent: May 2, 2023

(54) SYSTEM AND METHOD FOR VENDING MACHINE

(71) Applicant: Stripe, Inc., South San Francisco, CA (US)

(72) Inventors: Chi Wah Lo, Tsuen Wan (HK); Tai Kwan Jimmy Tang, Tsuen Wan (HK); Wai Chuen Gan, Tsuen Wan (HK)

(73) Assignee: STRIPE, INC., South San Francisco, CA (US)

( * ) Notice: Subject to any disclaimer, the term of this patent is extended or adjusted under 35 U.S.C. 154(b) by 31 days.

(21) Appl. No.: 17/320,551

(22) Filed: May 14, 2021

(65) Prior Publication Data

US 2021/0365911 A1 Nov. 25, 2021

Related U.S. Application Data

(60) Provisional application No. 63/027,407, filed on May 20, 2020.

(51) Int. Cl.
*G06Q 20/18* (2012.01)
*G06K 7/14* (2006.01)

(52) U.S. Cl.
CPC .......... *G06Q 20/18* (2013.01); *G06K 7/1417* (2013.01)

(58) Field of Classification Search
None
See application file for complete search history.

(56) References Cited

U.S. PATENT DOCUMENTS

| | | | | |
|---|---|---|---|---|
| 9,153,089 B1* | 10/2015 | Hewett | ................ | G07F 9/001 |
| 2014/0263630 A1* | 9/2014 | Richardson | ........ | G06Q 20/3276 235/381 |
| 2014/0297256 A1* | 10/2014 | Rogowski | ................ | G06K 9/00 704/2 |
| 2015/0088307 A1* | 3/2015 | Ackerman | ........... | G06Q 10/087 700/241 |

(Continued)

OTHER PUBLICATIONS

"Vending How it Works—Coca-Cola, https://us.coca-cola.com/vending/how-it-works, 2017" (Year: 2017).*

*Primary Examiner* — Kito R Robinson
*Assistant Examiner* — Toan Duc Bui
(74) *Attorney, Agent, or Firm* — Womble Bond Dickinson (US) LLP

(57) ABSTRACT

A system comprises a client module installed on a vending machine, the vending machine displaying one or more items for purchase in a first arrangement, and a purchase fulfilment subsystem. A QR code is generated by the purchase fulfilment subsystem and transmitted to the client module. A first set of signals to initiate a transaction is transmitted by the user device to the purchase fulfilment system. The purchase fulfilment subsystem transmits to the user device a second set of signals to display elements in a second arrangement. The user device transmits a third set of signals to the purchase fulfilment subsystem related to activation of an element. The purchase fulfilment subsystem transmits to the client module a fourth set of signals comprising commands to enable the vending machine to dispense an item. The client module sends one or more instructions to the vending machine to dispense the item.

18 Claims, 7 Drawing Sheets

(56) References Cited

U.S. PATENT DOCUMENTS

| | | | |
|---|---|---|---|
| 2015/0235202 A1* | 8/2015 | Zabala | G06Q 20/326 700/232 |
| 2016/0055598 A1* | 2/2016 | Ramini | G06Q 50/12 705/15 |
| 2016/0203352 A1* | 7/2016 | Marsico | G06K 7/1417 235/375 |
| 2017/0026321 A1* | 1/2017 | Ciavatta | H04L 51/04 |
| 2018/0253718 A1* | 9/2018 | Khan | G06Q 20/326 |
| 2018/0288594 A1* | 10/2018 | Kim | H04W 76/14 |
| 2018/0308079 A1 | 10/2018 | Zong et al. | |
| 2020/0279459 A1* | 9/2020 | Singh | H04W 4/12 |
| 2020/0342438 A1* | 10/2020 | Chew | G06Q 20/3274 |
| 2021/0195385 A1* | 6/2021 | Muddi | H04W 4/42 |
| 2022/0366448 A1* | 11/2022 | Doumar | G06Q 50/01 |

* cited by examiner

SYSTEM AND METHOD FOR VENDING MACHINE

CROSS-REFERENCE TO RELATED APPLICATIONS

This application claims the benefit of U.S. Provisional Application No. 63/027,407, filed on May 20, 2020, entitled SYSTEM AND METHOD FOR VENDING MACHINE, which is incorporated herein by reference in its entirety.

TECHNICAL FIELD

The present disclosure relates to vending machines.

SUMMARY

A system to enable a user to purchase a desired at least one of one or more items for purchase displayed in a vending machine via a user device, the system comprising: A client module installed on the vending machine, wherein the vending machine displays the one or more items for purchase in a first arrangement; and a purchase fulfilment subsystem, wherein: the user device, client module and purchase fulfilment system are coupled to each other via one or more interconnections, a QR code is dynamically generated by the purchase fulfilment subsystem, transmitted to the client module via the one or more interconnections, and displayed by the client module for scanning by the user device, a first set of signals is generated by the user device based on the scanning of the QR code, transmitted by the user device to the purchase fulfilment system via the one or more interconnections, and the first set of signals comprises data to initiate a transaction, the purchase fulfilment subsystem receives the transmitted first set of signals, generates, based on the received first set of signals, a second set of signals, and transmits the second set of signals to the user device, the second set of signals comprising data to enable display of a user interface comprising one or more elements in a second arrangement on a display of the user device, the one or more elements corresponding to the one or more items displayed by the vending machine, the user device, based on an activation of at least one of the one or more elements on the user interface by the user, transmits a third set of signals to the purchase fulfilment subsystem via the one or more interconnections, and the third set of signals comprising information related to the activation of the at least one of the one or more elements, the purchase fulfilment subsystem receives the third set of signals, processes the information related to the activation to produce a fourth set of signals comprising one or more commands to enable the vending machine to dispense the desired at least one item to the user, and transmits the fourth set of signals to the client module over said network, and the client module receives the fourth set of signals, and based on the one or more commands within the fourth set of signals, sends one or more instructions to the vending machine to perform one or more mechanical movements and thereby enable the desired at least one item to be dispensed to the user.

A method to enable a user to purchase a desired at least one of one or more items for purchase displayed in a vending machine via a user device, the method comprising: dynamically generating, by a purchase fulfilment subsystem, a QR code; transmitting, by the purchase fulfilment subsystem, the generated QR code to a client module; displaying, by the client module, the QR code for scanning by the user device; generating, by the user device, a first set of signals based on the scanning of the QR code, wherein the first set of signals comprises data to initiate a transaction; transmitting, by the user device, the first set of signals to the purchase fulfilment system via the one or more interconnections; receiving, by the purchase fulfilment subsystem, the transmitted first set of signals; generating, by the purchase fulfilment subsystem, a second set of signals based on the received first set of signals, wherein: the second set of signals comprises data to enable display of a user interface comprising one or more elements in a second arrangement on a display of the user device, and the one or more elements corresponding to the one or more items displayed by the vending machine; transmitting, by the purchase fulfilment subsystem, the second set of signals to the user device; transmitting, by the user device, a third set of signals to the purchase fulfilment subsystem based on an activation of at least one of the one or more elements on the user interface by the user, the third set of signals comprising information related to the activation of the at least one of the one or more elements; receiving, by the purchase fulfilment subsystem, the third set of signals; processing, by the purchase fulfilment subsystem, the information related to the activation to produce a fourth set of signals comprising one or more commands to enable the vending machine to dispense the desired at least one item to the user; transmitting, by the purchase fulfilment subsystem, the fourth set of signals to the client module; receiving, by the client module, the fourth set of signals; and sending, by the client module, one or more instructions to the vending machine to perform one or more mechanical movements and thereby enable the desired at least one item to be dispensed to the user, the one or more instructions based on the one or more commands within the fourth set of signals.

A method to enable a user to purchase a desired at least one of one or more items for purchase displayed in a vending machine via a user device, the method comprising: providing a client module installed on the vending machine, wherein the vending machine displays the one or more items for purchase in a first arrangement; providing a purchase fulfilment subsystem, wherein: the user device, client module and purchase fulfilment system are coupled to each other via one or more interconnections, a dynamically generated QR code is generated by the purchase fulfilment subsystem, transmitted to the client module via the one or more interconnections, and displayed by the client module for scanning by the user device, a first set of signals is generated by the user device based on the scanning of the QR code, transmitted by the user device to the purchase fulfilment system via the one or more interconnections, and the first set of signals comprises data to initiate a transaction; the purchase fulfilment subsystem receives the transmitted first set of signals, generates, based on the received first set of signals, a second set of signals, and transmits the second set of signals to the user device, the second set of signals comprising data to enable display of a user interface comprising one or more elements in a second arrangement on a display of the user device, the one or more elements corresponding to the one or more items displayed by the vending machine; the user device, based on an activation of at least one of the one or more elements on the user interface by the user, transmits a third set of signals to the purchase fulfilment subsystem via the one or more interconnections, the third set of signals comprising information related to the activation of the at least one of the one or more elements; the purchase fulfilment subsystem receives the third set of signals, processes the information related to the selection to produce a fourth set of signals comprising one or more commands to enable the vending machine to dispense the desired at least one item to the user, and transmits the fourth set of signals to the client module over said network; and the client module receives the fourth set of signals, and based on the one or more commands within the fourth set of signals, sends one or more instructions to the vending machine to perform one or more mechanical movements and thereby enable the desired at least one item to be dispensed to the user.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. The phrase "at least one of," when used with a list of items, means that different combinations of one or more of the listed items may be used, and only one item in the list may be needed. Definitions for certain words and phrases are provided throughout this patent document, those of ordinary skill in the art should understand that in many, if not most instances, such definitions apply to prior, as well as future uses of such defined words and phrases.

The terms "transmit," "receive," and "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. The term "processor" or similar terms can include one or more processors or other processing devices.

As used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding, reference is now made to the following description taken in conjunction with the accompanying Drawings in which.

Figure 1:
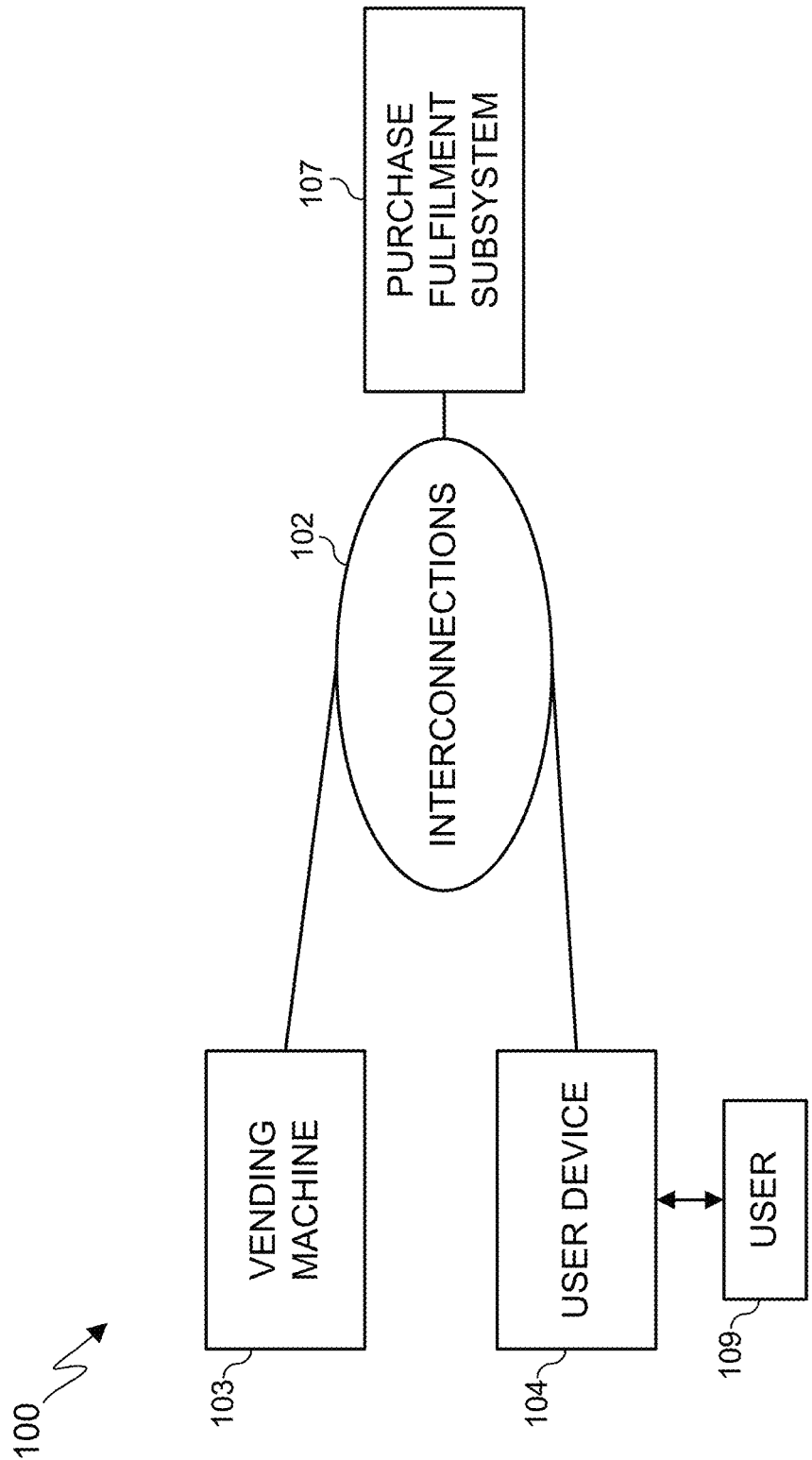
FIG. 1 illustrates an example of a system to enable a user to purchase items from a vending machine via a user device in accordance with various embodiments of this disclosure.

While the present disclosure is susceptible to various modifications and alternative forms, specific embodiments or implementations have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of an invention as defined by the appended claims.

DETAILED DESCRIPTION

In prior vending machines, many physical interactions with the machine are required by the user. With the increasing awareness of the importance of public health and hygiene, there is a need to reduce the amount of physical contact with the actual machines.

Typically for a user to operate a vending machine, the user needs to select the merchandise and make a payment. After these steps, the vending machine makes final delivery of the merchandise. In the selection step, the user needs to choose the item that the user wants to purchase by pressing a button, a number pad or a touchscreen. The available one or more merchandise items are usually displayed as real-life samples, images, descriptions or otherwise representing the item, with the price of the merchandise indicated clearly. In the payment step, the user pays the cost of the item by various methods: cash, credit or debit cards and e-wallets such as ApplePay®, GooglePay® and AndroidPay® or Europay, Mastercard, Visa (EMV) Secure Remote Commerce (SRC) or other mobile payment options. Either the selection step or the payment step can be the first step. When the prices of all available items only have a few possible values, payment followed by the selection is the common flow, e.g. in canned beverage vending machines. When the items cover a wide range of items, selection is done first followed by the payment, e.g. snack vending machines. In both cases, the merchandise is delivered only when the selection is valid (not out-of-stock) and the payment is successful with full amount received.

The prior vending machines pose several problems. Typically, the user has to physically interact with the vending machine by, for example, pressing buttons on the vending machine or on a touchscreen associated with the vending machine to make selections and payments. This increases the risk of transmission of contagious diseases such as COVID-19, Severe Acute Respiratory Syndrome (SARS), H1N1 and Middle East Respiratory Syndrome (MERS), as a sick person may interact with the vending machine, and the user may catch the same disease. Furthermore, having more mechanical elements such as buttons and touchscreens lead to increased risk of breakdowns and maintenance costs. Also, the flexibility of the vending machines is reduced as the payment functionalities of the vending machine is limited to the already installed functionality. For example, many prior vending machines are physically configured to only take cash or credit or debit cards, and are not enabled to take other forms of electronic payments such as e-wallets and mobile payments. Reconfiguring a prior vending machine to take payments from an e-wallet or mobile payment systems may be very difficult and expensive.

Previously, in United States Patent Application Publication 2018/0308079 on "Vending Machine, Method and Device for Controlling the Same and System Thereof", assigned Ser. No. 15/645,431 filed on Jul. 10, 2017 to Zong et al, a system and method for an online supermarket was disclosed. A user can scan a quick response (QR) code attached to a vending machine to access an online supermarket. While this application reduces the need for contact with a vending machine, the QR code is printed and attached to the body of the vending machine. Printed codes have less flexibility and are more difficult to change when updating is needed. QR codes which are generated dynamically and digitally displayed offer far more flexibility and functionality compared to static printed QR codes. It may also be cheaper to update such codes.

A system and method for a user to purchase a desired one or more items for purchase displayed in a vending machine via a user device and which overcomes the problems with prior systems and methods for user interaction with vending machines is described below. The system and method described below is applicable to a wide variety of applications including but not limited to vending machines, kiosks, ticketing machines, toy-capsule machines, coffee/soda/ice-cream dispensers. self-service photo-booths or even courier locker boxes.

FIG. 1 illustrates an example of a system 100 in accordance with various embodiments of this disclosure. The system 100 includes a vending machine 103, a user device 104 associated with user 109, and a purchase fulfilment subsystem 107, coupled to each other via interconnections 102.

In the system 100, the interconnections 102 perform the function of communicatively coupling the various components of the system 100 to each other. The interconnections 102 may be implemented in a variety of ways. For example, in some embodiments, the interconnections 102 comprise one or more networks. In some of these embodiments, one or more of these one or more networks comprise one or more subnetworks. The one or more networks comprise, for example, wireless networks, wired networks, Ethernet networks, local area networks, metropolitan area networks and optical networks. In some embodiments, the one or more networks comprise at least one of a private network such as a virtual private network or a public network such as the Internet.

In some embodiments, the interconnections 102 also comprise one or more direct connections between the components of system 100. Various wired or wireless communications protocols known to those of skill in the art may be used to implement interconnections 102. These include, for example, BLUETOOTH®, Wi-Fi, Near Field Communications (NFC), Radio Frequency Identification (RFID), 3G, Long Term Evolution (LTE), 4G, 5G, Universal Serial Bus (USB), the Infrared Data Association (IrDA) suite of protocols, LiFi and other protocols and technologies known to those of skill in the art.

Figure 2:
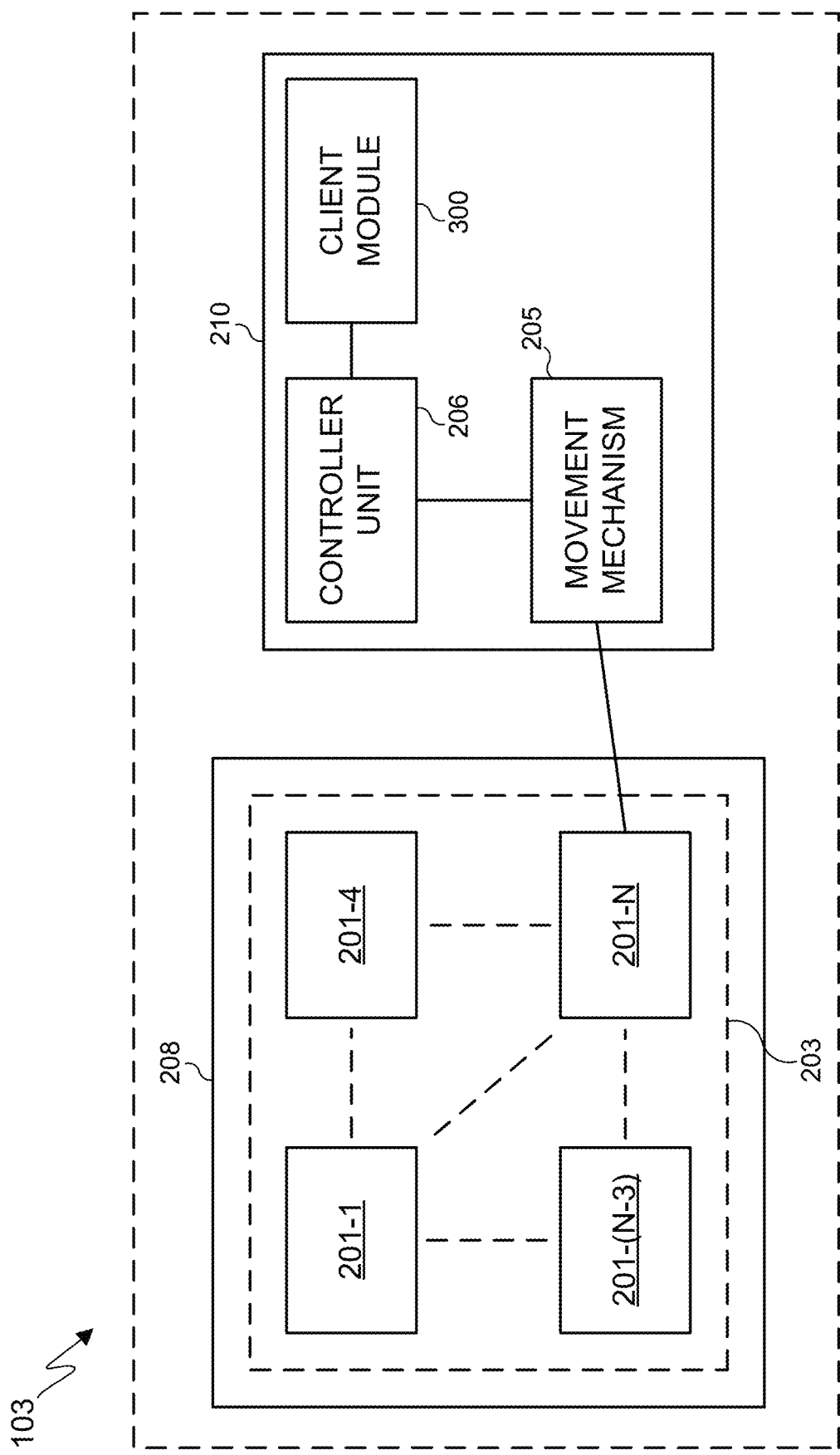
FIG. 2 illustrates a detailed diagram of a vending machine in accordance with various embodiments of this disclosure.

FIG. 2 illustrates the vending machine 103 in more detail in accordance with various embodiments of this disclosure. In a front end 208 of the vending machine 103, a set of one or more physical items 201-1 to 201-N for purchase are displayed to user 109 in a first arrangement 203. The one or more items include but are not limited to snacks, chocolates, drinks and other items known to those of skill in the art. In some embodiments, each of the one or more physical items 201-1 to 201-N includes information related to the item. This information comprises, for example, a price of the item and codes related to the item. The user 109 retrieves packages from the front end 208 of the vending machine 103.

In a back-end 210 of the vending machine 103, a controller unit 206 receives one or more signals comprising commands or instructions to dispense the one or more items to the user 109, and based on the received one or more signals, the controller unit 206 sends commands and instructions to a coupled movement mechanism 205 to perform one or more mechanical movements to dispense one or more of the one or more items to 201-1 to 201-N the user. A client module 300 is installed in the vending machine 103 and is coupled to the controller unit 206. The client module 300 enables the vending machine 103 to interact with, for example, the purchase fulfilment subsystem 107 and the user device 104 via the interconnections 102. As will be discussed below, various embodiments of the client module 300 are possible.

Figure 3:
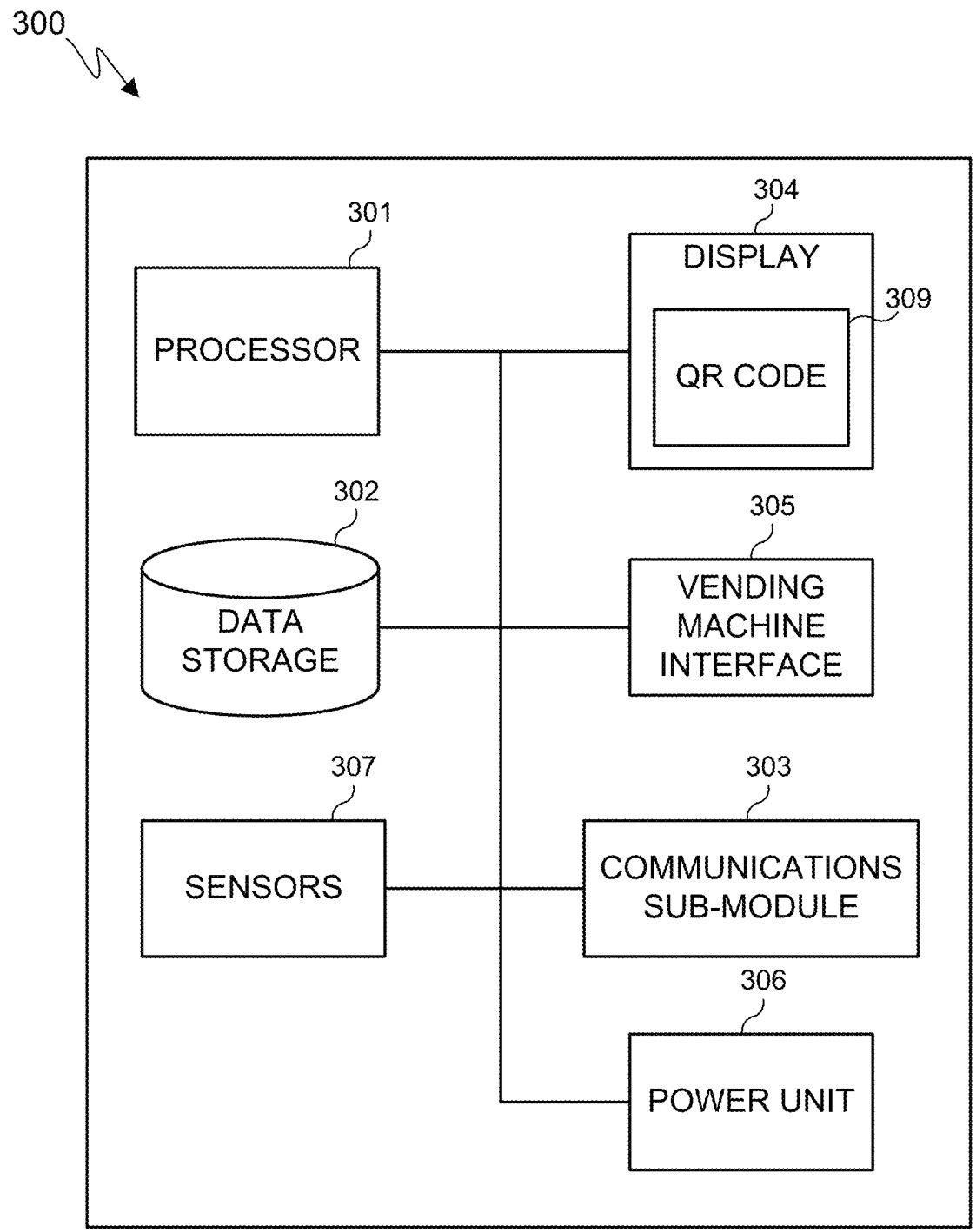
FIG. 3 illustrates a detailed diagram of a client module in accordance with various embodiments of this disclosure.

FIG. 3 illustrates a detailed diagram of the client module 300 in accordance with various embodiments of this disclosure. In some embodiments, the client module 300 consists of a processor 301, a data storage 302, a communications sub-module 303, a display 304, a vending machine interface 305, a power unit 306, and sensors 307. The processor 301 controls the operation flow of the client module. The storage 302 stores programs and data necessary for operation of the client module 300.

The communications sub-module 303 allows the client module 300 to communicatively couple to the user device 104 and the purchase fulfilment subsystem 107 via the interconnections 102. The communications sub-module 303 supports one or more wired or wireless communications via protocols and technologies such as BLUETOOTH®, Wi-Fi, Near Field Communications (NFC), Radio Frequency Identification (RFID), 3G, Long Term Evolution (LTE), 4G, 5G, USB, the IrDA set of protocols and LiFi and other protocols and technologies known to those of skill in the art. In some embodiments, the communications sub-module 303 allows the client module 300 to be used as an internet Access Point (AP), so that the user device 104 can connect to the purchase fulfilment subsystem 107 via the client module 300. The communication between the user device 104 and client module 300 can be performed using various protocols including by not limited to WiFi, BLUETOOTH®, the IrDA set of protocols and LiFi. In some embodiments, one of interconnections 102 is a direct communication channel between the user device 104 and the client module 300. After the initial setup of the communication channel, the vending machine transaction proceeds in the same manner as the presented invention.

The display 304 is for the display of information comprising information related to the vending machine and/or Uniform Resource Locator (URL) of the website hosted by the purchase fulfilment subsystem 107. This display is, for example, a liquid crystal display (LCD) or a display based on other suitable technology known to those of skill in the art. In some embodiments, the display prompts and enables the user to scan or otherwise read some data to, for example, bring up a website hosted by purchase fulfilment subsystem 107, or launch an application on a user device hosted by purchase fulfilment subsystem 107.

In some embodiments, the display is used to display a QR code 309. The QR code 309 comprises, for example, information to indicate the identity of the vending machine, or information necessary for user device 104 to request data from a website hosted by purchase fulfilment subsystem 107. The website is related to, and enables interaction with, the vending machine 103. This information includes, for example, the Uniform Resource Locator (URL) of the website. The request is performed using a browser 104-8, and the requested data can be viewed by the user 109 on the display screen 104-3 of the user device 104. The information also includes, for example, information necessary for the user device 104 to launch an application 104-4 on the display screen 104-3 of the user device 104. The application is related to, and enables interaction with, the vending machine 103. The application 104-4 is hosted by the purchase fulfilment subsystem 107.

As will be explained later, the QR code 309 is generated dynamically by the purchase fulfilment subsystem 107.

The vending machine interface 305 couples the client module 300 to the rest of the back end 210 of the vending machine 103, so as to enable the processor 301 to send one or more command signals to the controller unit 206, and thereby control the movement mechanism 205 of the vending machine 103. The vending machine interface 305 enables communication between the client module 300 and the controller unit 206 using communication protocols such as Multi-Drop Bus (MDB), Data Exchange (DEX), Vending Data Interchange (VDI); or other protocols known to those of skill in the art. The controller unit 206 then sends instructions to the movement mechanism 205 to perform one or more mechanical movements as necessary to enable one or more of the one or more items 201-1 to 201-N to be dispensed to user 109.

The power unit 306 allows the 1 client module 300 to draw electricity to power the operation of the client module 300. The client module 300 can, for example draw power from a variety of sources such as a main power supply, one or more batteries, and/or other suitable power sources known to those of skill in the art.

The sensors 307 enable the client module 300 to take various sensor readings relevant to the status of the vending machine, for example, humidity, temperature, inventory level and ambient light condition. These readings can then be communicated by the client module 300 to the purchase fulfilment subsystem 107 to update the status of the vending machine, In some embodiments, the client module 300 is retrofitted to a conventional vending machine. This involves coupling the client module 300 to a controller unit such as controller unit 206 in a conventional vending machine to enable the movement mechanism 205 in the machine to dispense items. In some of these embodiments, a database in the purchase fulfilment subsystem 107 is initialized with the information available from the conventional vending machine. This will be discussed in further detail below.

One of skill in the art would know that various configurations are possible for client module 300. For example, in some embodiments, some of the components of client module 300 may already be present within the vending machine 103. For example, the vending machine 103 may already have one or more of a display 304 capable of showing a QR code 309, a power unit 306, and communications sub-module 303. In these cases, the client module 300 comprises the remaining components.

In other embodiments, the client module 300 is implemented entirely in software. For example, the vending machine 103 may already have all the physical functionalities similar to components 301-307 of client module 300, but not be configured or enabled to communicate with the user device 104 or the purchase fulfilment subsystem 107. Then, implementation of the client module 300 comprises installing software by, for example, installing new software applications or modifying software already existing on the vending machine 103 to enable communications with the user device 104 and/or the purchase fulfilment subsystem 107.

In other embodiments, the client module 300 is implemented as a combination of hardware and software. For example, in some embodiments, software needs to be installed on the vending machine 103 and new hardware components are supplied to enable the vending machine 103 to communicate with the user device 104 and/or the purchase fulfilment subsystem 107.

Figure 4:
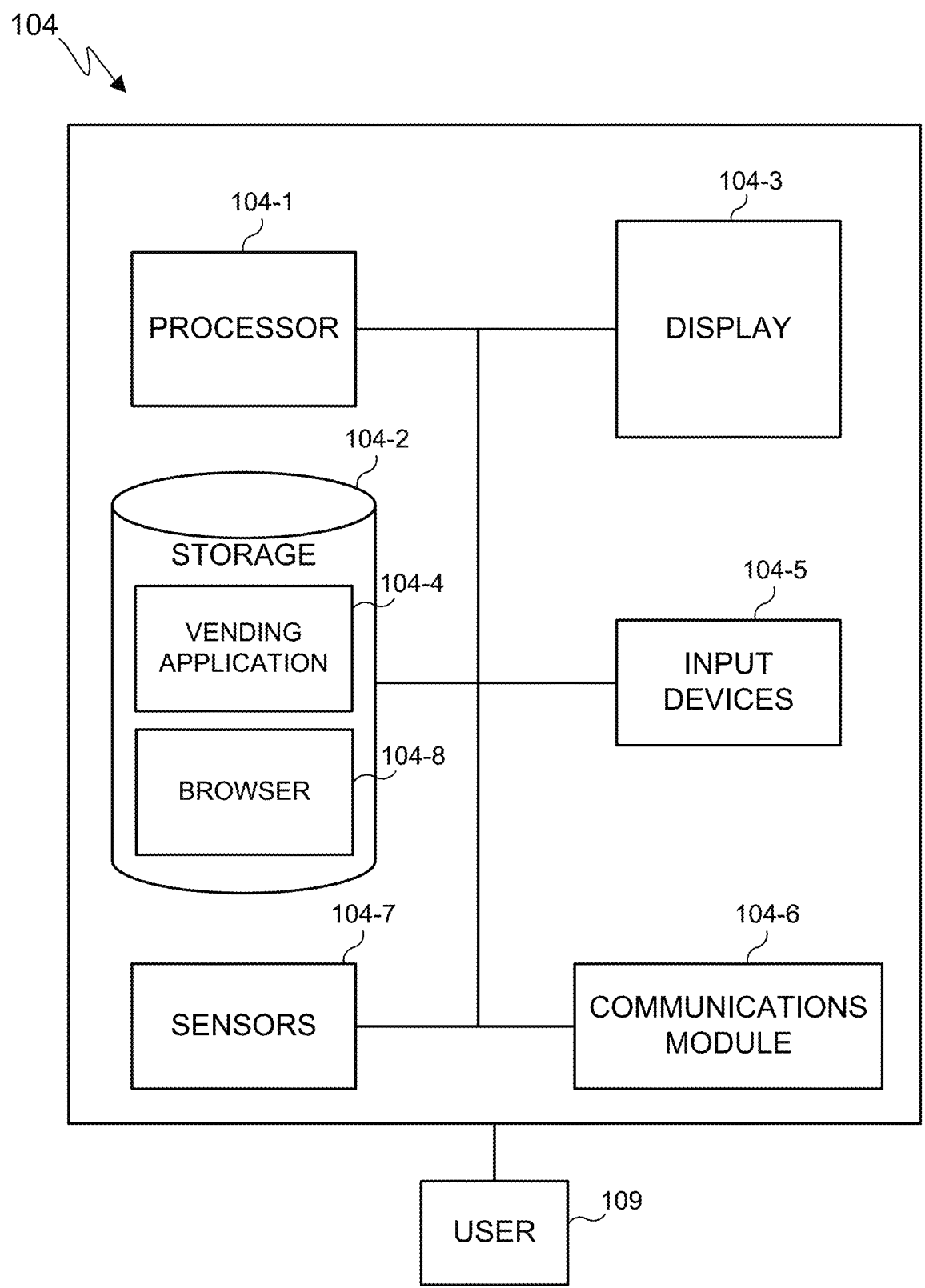
FIG. 4 illustrates a detailed diagram of a user device in accordance with various embodiments of this disclosure.

FIG. 4 illustrates a detailed diagram of the user device 104 in accordance with various embodiments of this disclosure. The user device 104 is associated with the user 109. The user device 104 is, for example a smartwatch, smartphone, tablet, laptop, or any appropriate computing and network-enabled device. One example of the user device 104 is shown in FIG. 2. A processor 104-1 performs processing functions and operations necessary for the operation of the user device 104, using data and programs stored in a storage 104-2. Examples of such programs are vending application or "app" 104-4 which will be discussed in more detail below, and browser 104-8. The app 104-4 allows the user 109 to interact with the vending machine 103 and the purchase fulfilment subsystem 107 via user device 104. Display 104-3 performs the function of displaying data and information for user 109. Input devices 104-5 allow the user 109 to enter information. This includes, for example, devices such as a touch screen, mouse, keypad, keyboard, microphone, camera, video camera and so on. In some embodiments, the display 104-3 is a touchscreen which means it is also part of the input devices 104-5. The communications module 104-6 allows the user device 104 to communicate with devices and networks external to the user device 104. For example, user device 104 communicates with the other components of the system 100 via the interconnections 102 and the communications module 104-6. Communications module 104-6 supports one or more wired or wireless communications via protocols and technologies such as BLUETOOTH®, Wi-Fi, Near Field Communications (NFC), Radio Frequency Identification (RFID), 3G, Long Term Evolution (LTE), 5G, Universal Serial Bus (USB) and other protocols and technologies known to those of skill in the art. Sensors 104-7 perform functions to sense or detect environmental or locational parameters. The sensors 104-7 include, for example, accelerometers, gyroscopes, magnetometers, barometers, Global Positioning System (GPS), proximity sensors and ambient light sensors. The components of user device 104 are coupled to each other as shown in FIG. 4.

The browser 104-8 is used to interface with the World Wide Web (WWW). As will be discussed below, in some embodiments, the browser 104-8 communicates with a website which is maintained by the purchase fulfilment subsystem 107. The purchase fulfilment subsystem 107 performs several different functions. These include, for example: receiving orders from user device 104; processing payments received from user device 104; maintaining the inventory status of vending machines such as vending machine 103; recording and storing the purchase history of user 109; hosting a website for viewing via browser 104-8 of user device 104, and/or a vending app such as app 104-4 of user device 104; generating a user interface for display on the website for viewing via browser 104-8 of user device 104, and/or the vending app such as app 104-4 of user device 104; generating QR codes to display on client module 300; and recording status information on vending machines such as vending machine 103.

Figure 5:
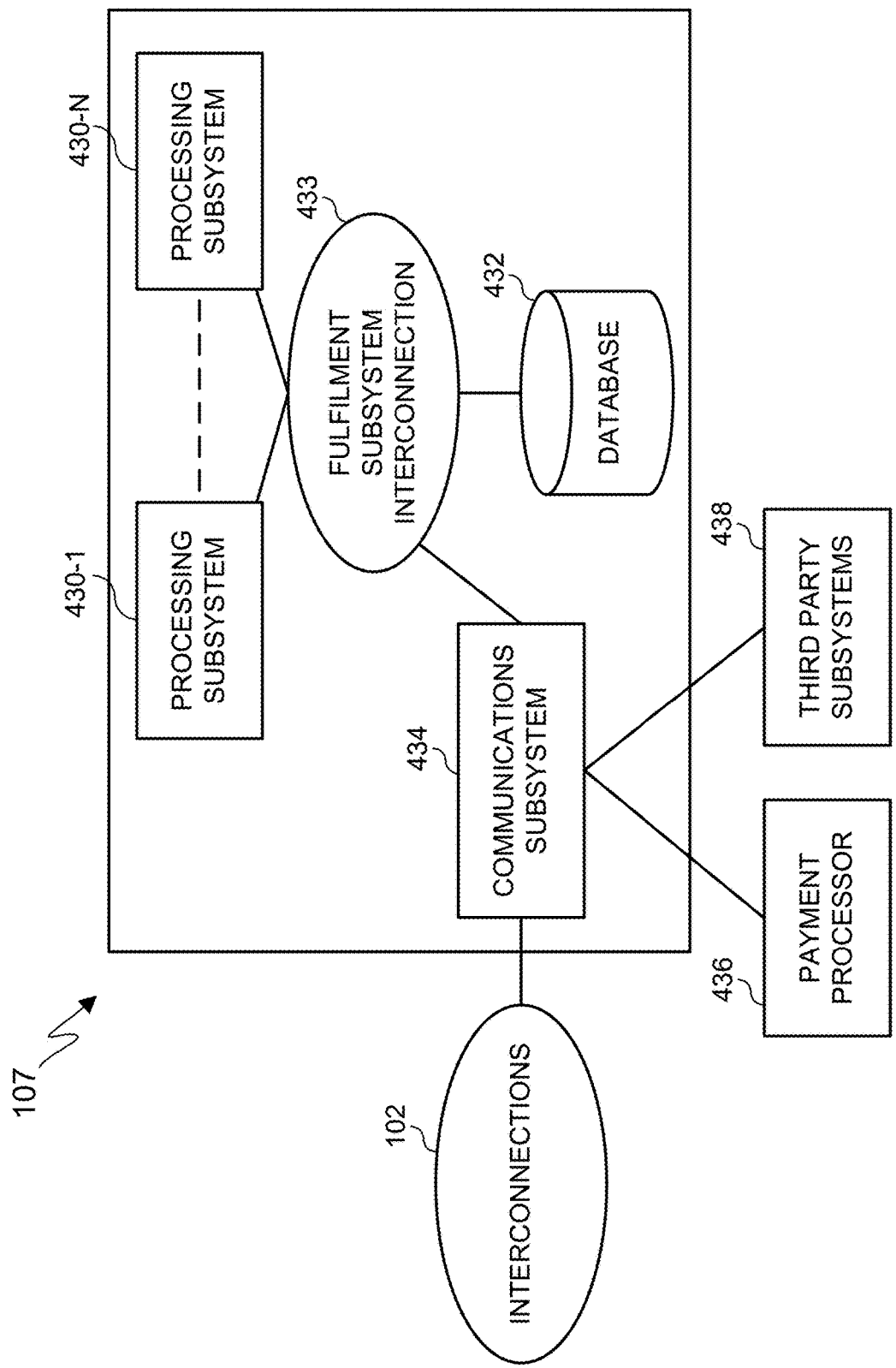
FIG. 5 illustrates a detailed diagram of a purchase fulfillment subsystem in accordance with various embodiments of this disclosure.

FIG. 5 illustrates a detailed diagram of an example purchase fulfilment subsystem 107 in accordance with various embodiments of this disclosure. In FIG. 5, a fulfilment subsystem interconnection 433 connects the various components of the purchase fulfilment subsystem 107 to each other. In some embodiments, the interconnection 433 is implemented using, for example, network technologies known to those in the art. These include, for example, wireless networks, wired networks, Ethernet networks, local area networks, metropolitan area networks and optical networks. In some embodiments, the interconnection 433 comprises one or more subnetworks. In some embodiments, the interconnection 433 comprises other technologies to connect multiple components to each other including, for example, buses, coaxial cables, USB connections and so on.

A communications subsystem 434 receives information originating from, and transmits information to, destinations external to the purchase fulfilment subsystem 107. These include components of the system 100 via interconnections 102, third party subsystems 438, and a payment processor 436. The communications subsystem 434 supports one or more wired or wireless communications via various protocols and technologies known to those of skill in the art.

A database 432 stores information and data for use by purchase fulfilment subsystem 107. This information comprises, for example: inventory data for each of the items in vending machine 103; purchase history of a user such as user 109; information necessary to dynamically generate a QR code such as QR code 309 in FIG. 3, such as for example, a URL of a website to enable user 109 to interact with the vending machine 103, status information for vending machines such as vending machine 103; and preferences of users such as user 109.

Users such as user 109 can input data to database 432 using, for example, app 104-4 running on user device 104. In other embodiments, data is uploaded to database 432 from other components of system 100 such as vending machine 103.

In some embodiments, database 432 further comprises a database server. The database server receives one or more commands from, for example, processing subsystem 430-1 to 430-N and communication subsystem 434, and translates these commands into appropriate database language commands to retrieve and store data into the database 432. In some embodiments, the database 432 is implemented using one or more database languages known to those of skill in the art, including, for example, Structured Query Language (SQL). In some embodiments, the database 432 stores data for a plurality of users similar to user 109. Then, there may be a need to keep the set of data related to each user separate from the data relating to the other users. To achieve this, in some embodiments, the database 432 is partitioned so that data related to each user is separate from the other users. In some embodiments, each user has an account with a login and a password or other appropriate security measures to ensure that they are only able to access their data, and unauthorized access of their data is prohibited. In some embodiments, when data is entered into the database 432, associated metadata is added so as to make it more easily searchable. In some embodiments, the associated metadata comprises one or more tags. In some embodiments, database 432 presents an interface to enable the entering of search queries. In some embodiments, the data stored within the database 432 is encrypted for security reasons. In further embodiments, other privacy-enhancing data security techniques are employed to protect the database 432.

In some embodiments, the database 432 stores data for a plurality of vendors, where each vendor operates one or more vending machines similar to vending machine 103. Then, there may be a need to keep the set of data related to each vendor separate from the data relating to the other vendors. This may be achieved by partitioning the database 432 and using appropriate security measures to ensure that each vendor is only able to access their data, and unauthorized access of their data is prohibited. Other data functionalities as explained above for user data can be applied to vendor data as well.

Additionally, the database 432 may store one or more algorithms or programs necessary for the operation of processing subsystems 430-1 to 430-N.

As explained above, in some of the embodiments where the client module 300 is retrofitted to a conventional vending machine, database 432 is initialized with the information available from the conventional vending machine. In some embodiments, initialization comprises the following: The installation technician uses a device with a software application to capture an image of the front end 208 of the vending machine 103. This image is then transmitted to the processing subsystems 430-1 to 430-N via the interconnections 102. Using pattern recognition, optical character recognition (OCR) and image processing techniques known to those of skill in the art, the initial available merchandises and their prices are computed and determined by the processing subsystems 430-1 to 430-N. This obtained data is then used to, for example, update database 432.

During regular maintenance events such as inventory refilling or price updating, these techniques are employed to keep the data stored in the database 432 correct and up-to-date when there is a change in the merchandise (e.g. item 201-1 is changed from a COKE® to a Lemon Soda) or there is a change in the price for item 201-4 from 2.00 to 2.50.

The processing subsystems 430-1 to 430-N perform processing and analysis within purchase fulfilment subsystem 107 using one or more algorithms and programs residing on purchase fulfilment subsystem 107; data received from communications subsystem 434 and one or more portions of data retrieved from database 432. The algorithms and programs are stored in, for example, the database 432 as explained above, or within the processing subsystems 430-1 to 430-N.

Examples of operations performed by processing subsystems 430-1 to 430-N comprise:
  Processing orders and payments based on signals and information received from the user device 104 via the communications subsystem 434. In some embodiments, this may include interaction with components external to purchase fulfilment subsystem 107, such as the payment processor 436 and/or the third-party subsystems 438;
  Updating and maintaining the inventory status of vending machines such as the vending machine 103 based on information received from the vending machine 103 and/or vendor data retrieved from the database 432;
  Performing operations necessary to host websites and/or applications such as vending application 104-4;
  Performing operations necessary to generate interfaces such as user and payment interfaces to enable a user to interact with a vending machine on:
    A website for viewing via browser 104-8 of user device 104, and/or
    A vending app such as app 104-4 on user device 104;
  Dynamically generating QR codes to display on vending machine 103. As explained before, these QR codes comprise information necessary for user device 104 to launch a website on browser 104-8 of user device 104 such as URLs; or application 104-4 on user device 104. As required, the QR code is generated by the purchase fulfilment subsystem 107 and transmitted to the client module 300 via interconnections 102 for display on the client module 300. Using dynamically generated QR codes in this fashion allows for purchase fulfilment subsystem 107 to update the QR code so as to improve the functionality of the QR code. Updating the QR codes facilitates, for example:
    Updating of a URL for the web site to a different URL;
    Modification to include more identifying information,
    Enhancement of one or more security features of the QR code by, for example, enhancing the security of the URL of the web site or encoding a more secure URL of the website, and
    Including more information to enable, for example, better analytics to be performed by the purchase fulfilment subsystem 107 in conjunction with the third party sub system 438.

In some embodiments, the dynamic generating of the QR code occurs periodically, for example, once a week, or once a month.

Image processing, OCR and pattern recognition operations as needed in, for example, database initialization and inventory updates as discussed above, and user interface generation; and
  Managing the operations of one or more vending machines as will be explained below.

The purchase fulfilment subsystem 107 interacts with components outside of the system 100 such as the payment processor 436 and the third-party subsystems 438. Examples of third party subsystems 438 include but are not limited to: marketing analytics subsystems; location-based sub systems; and ordering sub systems.

Figure 6:
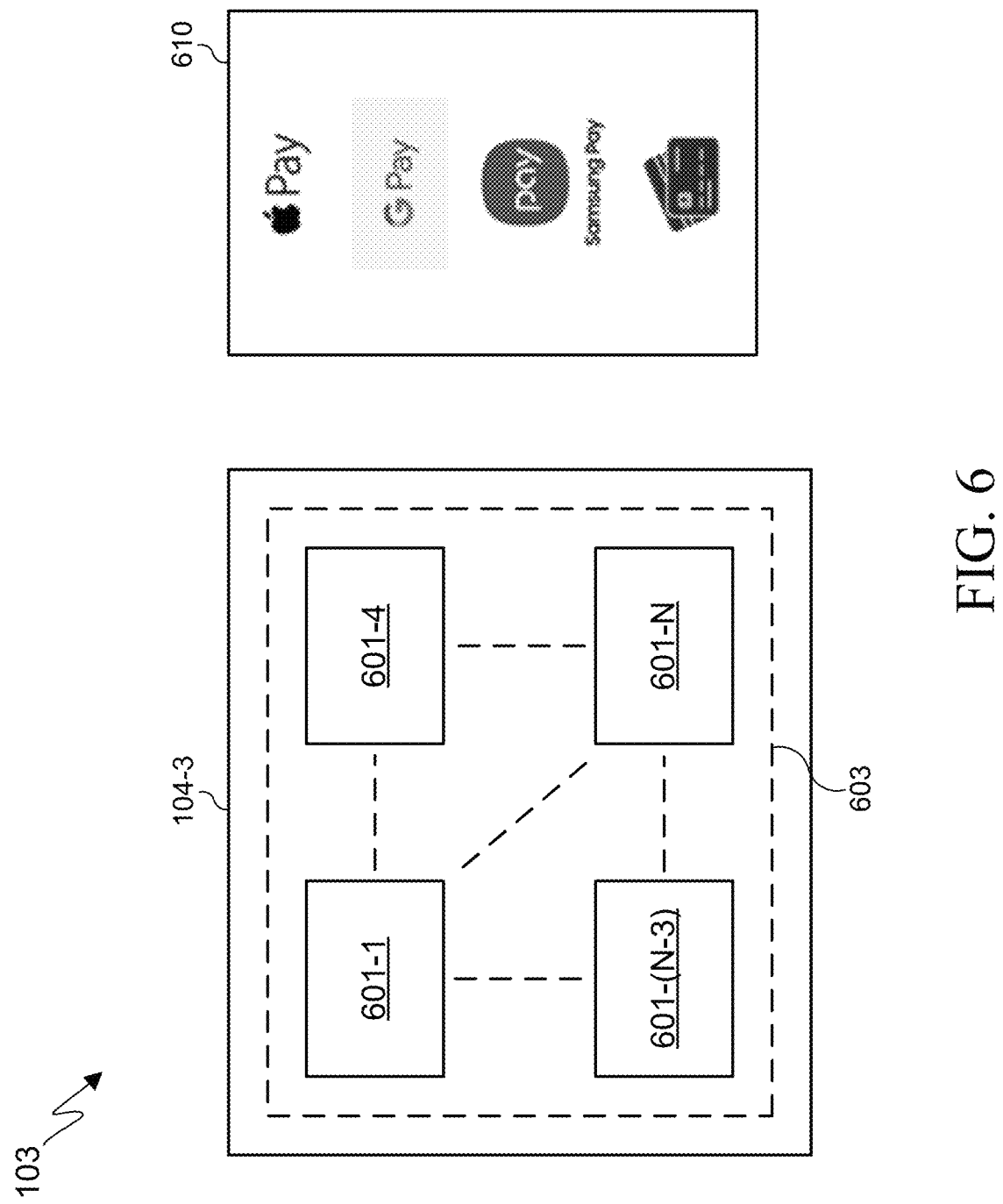
FIG. 6 illustrates examples of interfaces generated for display on a user device in accordance with various embodiments of this disclosure.

FIG. 6 illustrates examples of interfaces generated by processing subsystems 430-1 to 430-N for presentation on display 104-3, and to enable users to interact with and perform transactions on the vending machine 103 using the user device 104 in accordance with various embodiments of this disclosure. In FIG. 6, the user interface 600 comprises a set of elements 601-1 to 601-N arranged and displayed in an arrangement 603. In some embodiments, the arrangement 603 is related to the arrangement 203 of FIG. 2. For example, in some embodiments, the arrangement 603 is identical to the arrangement 203, so as to enable the user to visually correlate the physically displayed items with the elements displayed on display 104-3. In other embodiments, the arrangement 603 is created in accordance with the purchase history and/or the preferences of the user 109 stored in the database 432. The elements 601-1 to 601-N include, for example, descriptions of each of the physical items 201-1 to 201-N and prices of each of the physical items 201-1 to 201-N. In some embodiments, the user interface 600 is generated using a captured image of the arrangement 203. The captured image is, for example, an image obtained by an installation technician during database initialization during retrofitting of the client module 300 as described previously; or an image captured by the user 109 during operation of the vending machine, as will be described below. In these embodiments, the obtained image is processed by the purchase fulfilment subsystem 107 using, for example, one or more image processing, optical character recognition (OCR) and pattern recognition operations. The information obtained via the processing is used to generate arrangement 603 within user interface 600 as described above.

When the user 109 wants to make a selection of one or more of the physical items 201-1 to 201-N, user 109 makes a selection by activating one or more of these elements corresponding to the desired one or more items. Activating is achieved by, for example:

dragging a mouse pointer on a display of user device 104 to the element and clicking;

touching the element using a finger on a touchscreen of user device 104;

speaking appropriate voice commands into a speaker of user device 104;

swiping the element using a finger on a touchscreen of user device 104; and providing gestures or movements using different body parts such as fingers, hands, arms, head, face or body which are detected by one or more sensors or input devices of user device 104.

Upon activation, a set of signals comprising the selection request is sent from user device 104 to purchase fulfilment subsystem 107 via communications module 104-6 and interconnections 102. In some embodiments, if an item is not in stock in the vending machine 103, an out of stock indicator such as cross 604 is displayed within user interface 600. User interface 600 is not limited to only the information shown in FIG. 6. Other information which may be displayed include, for example, store location and payment information to enable user 109 to make payments. In some embodiments, the client module displays one or more instructions in a first language and the purchase fulfilment subsystem 107 generates the user interface to display one or more instructions in a second language.

User interface 600 is one example of an interface generated by processing subsystems 430-1 to 430-N. Another example interface is payment interface 610. In some embodiments, as shown in FIG. 6, payment interface 610 comprises one or more options necessary to enable user 109 to make payments via user device 104. Payment interface 610 also displays information related to the selection and may include fields to enable the user to enter information to make payment, such as credit or debit card information. Furthermore, the user can make payment option selection by performing the activation operations explained above.

In some embodiments, purchasing fulfilment subsystem 107 acts as a centralized control center of one or more vending machines. For example, as explained above, in some embodiments, processing subsystems 430-1 to 430-N manages a group of vending machines. Then, in some embodiments, when an item is sold out in one machine but still available in another one in the group, processing subsystems 430-1 to 430-N sends information to user device 104 to redirect users to one or more vending machines where the item is available. This information is, for example, displayed on user interface 600.

Various implementations are possible for the purchase fulfilment subsystem 107 and its components. In some embodiments, the purchase fulfilment subsystem 107 is implemented using a cloud-based approach. In some embodiments, the purchase fulfilment subsystem 107 is implemented across one or more facilities, where each of the components are located in different facilities and the interconnection 433 is then a network-based connection. In some embodiments, the purchase fulfilment subsystem 107 is implemented within a single server or computer. In some embodiments, the purchase fulfilment subsystem 107 is implemented across multiple servers or computers. In some embodiments, the purchase fulfilment subsystem 107 is implemented in software. In some embodiments, the purchase fulfilment subsystem 107 is implemented using a combination of software and hardware.

Figure 7:
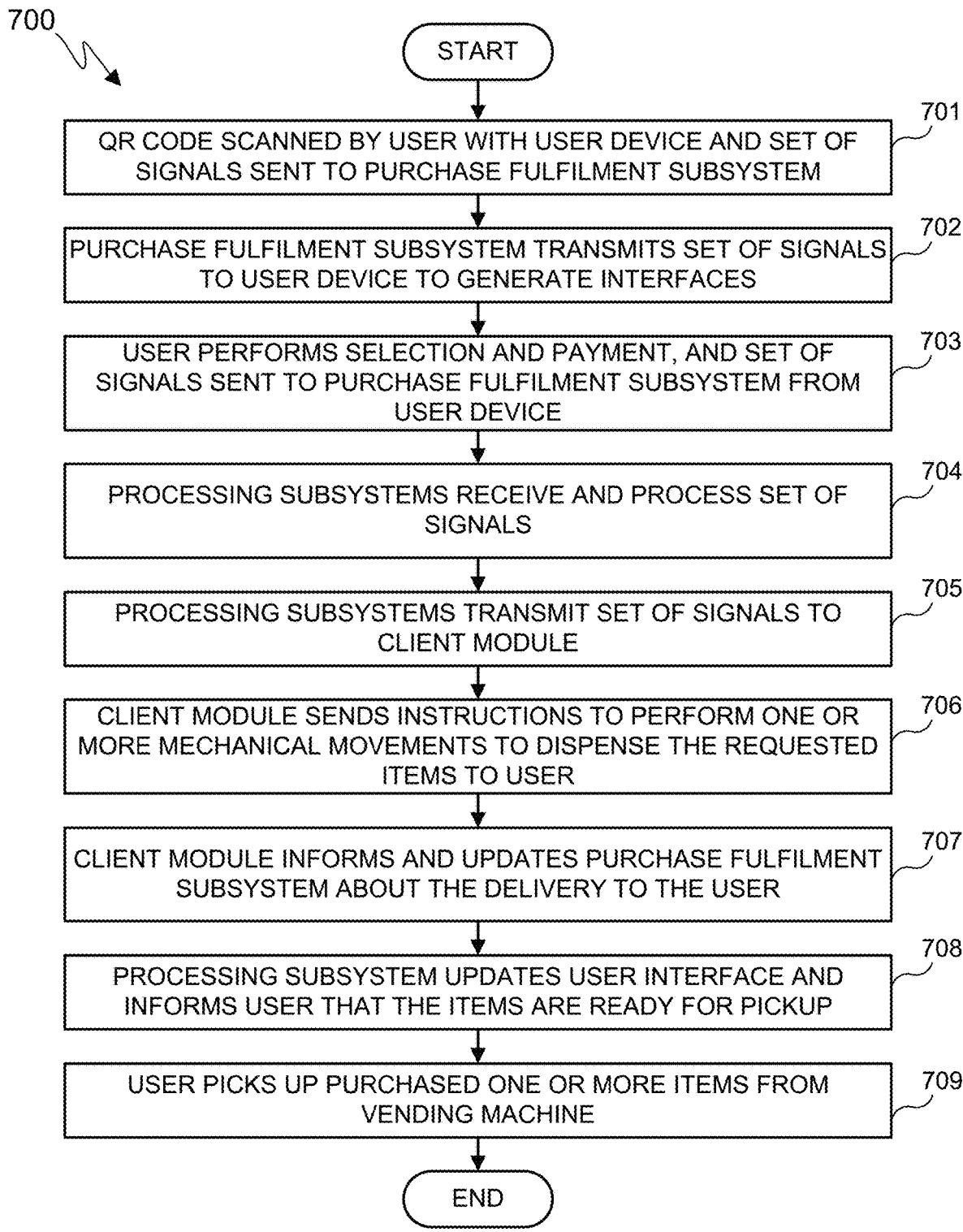
FIG. 7 illustrates an example flowchart for a user to purchase a desired at least one item from a vending machine in accordance with various embodiments of this disclosure.

FIG. 7 illustrates an example flowchart of a process 700 for user 109 to utilize user device 104 to purchase a desired at least one item from a vending machine in accordance with various embodiments of this disclosure. In step 701, a dynamically generated QR code 309 which has been generated by the purchase fulfilment subsystem 107 and transmitted to the client module 300 as explained above, is displayed on the display 304 of the client module 300. The user 109 is prompted by, for example, instructions displayed on the display 304 of the client module 300, to scan the QR code 309 using the user device 104. When the QR code 309 is scanned using the user device 104, the user device 104 processes the scanned QR code, then generates and transmits a set of signals to the purchase fulfilment system 107 via the interconnections 102. This set of signals comprises information to initiate a transaction using vending machine 103. In some embodiments, the information includes, for example, requests for data stored at a URL encoded within the QR code 309 and related to a website to enable the user to interact with the vending machine 103. In some embodiments, the information includes data to enable the user to utilize the application 104-4 to interact with the vending machine 103. As explained above, in some embodiments the client module 300 in the vending machine 103 has internet AP functionality. Then, in these embodiments, step 701 comprises the client module 300 prompting the user 109 to communicatively couple the user device 104 to this AP prior to prompting the user 109 to scan the QR code 309. Once the user has coupled to the AP, the user is prompted to scan the QR code 309 as outlined above. In some embodiments, step 701 comprises the client module prompting user 109 to take an image of front end 208 of vending machine 103 comprising the one or more items using a camera on user device 104, so as to capture arrangement 203. The obtained image is sent to purchase fulfilment subsystem 107 as part of the set of signals transmitted by user device 104. In some of these embodiments, the user interface displays the one or more instructions in a language different from that used by the client module display 304, and the one or more instructions are displayed based on an auto-translate function performed by the purchase fulfilment subsystem 107.

In step 702, the processing subsystems 430-1 to 430-N within purchase fulfilment subsystem 107 receives the set of signals sent in step 701. The processing subsystems 430-1 to 430-N processes this set of signals, and in response generates and transmits a set of signals to user device 104 comprising data to enable display of one or more of, for example, user interface 600, payment interface 610, and any other interfaces necessary for user 109 to perform transactions on display 104-3. Processes to generate the interfaces have been described previously. The user interface 600 is presented on display 104-3 in either:

a website served by processing subsystems 430-1 to 430-N of purchase fulfilment subsystem 107, and viewed by user 109 on browser 104-8; or application 104-4.

In step 703, user 109 performs selection and payment using the user device 104. As explained above, either selection or payment can be performed first. In some embodiments, user 109 selects one or more items and pays for the selection. In other embodiments, the user 109 pays first, and then selects one or more items. Selection comprises activating one or more of elements 601-1 to 601-N on user interface 600 corresponding to the one or more items desired by the user, as explained above. Payment is made using, for example, either the user interface 600 or the payment interface 610 as shown in FIG. 6. Based on this selection and payment, a set of signals comprising information related to the selection and payment made by the user 109 is transmitted from the user device 104 to the purchase fulfilment subsystem 107.

In step 704, the processing subsystems 430-1 to 430-N receives the set of signals transmitted in step 703 and processes the information related to selection and payments. In some embodiments, the processing subsystems 430-1 to 430-N interact with one or more of payment processor 436 and the third-party subsystems 438 to process the information related to selection and payment.

In step 705, based on the processing in step 704, the processing subsystems 430-1 to 430-N produces and sends a set of signals over interconnections 102 to client module 300 on vending machine 103. This set of signals comprises, for example, one or more commands to enable vending machine 103 to dispense the selected items to the user 109.

In step 706, client module 300 receives the set of signals sent in step 705. Based on this received set of signals, the client module 300 sends one or more instructions via the vending machine interface 305 to deliver the one or more items requested by the user 109. The transmitted one or more instructions are received by the controller unit 206. The controller unit 206 then sends commands or instructions to the movement mechanism 205 to perform one or more mechanical movements to dispense the one or more purchased items to the user for the user to pick-up.

In step 707, client module 300 sends a set of signals comprising
data to inform purchase fulfilment subsystem 107 about the delivery, and
an inventory status update to the purchase fulfilment subsystem 107.

In step 708, based on the set of signals transmitted in step 707, the processing subsystems 430-1 to 430-N updates the database 432 and the user interface 600 to reflect the new inventory status. The processing subsystems 430-1 to 430-N also informs user 109 via, for example, transmitting an alert to user device 104, that the one or more items are ready for pick up.

In step 709, the user 109 picks up the purchased one or more items from vending machine 103.

One of skill in the art would know that while the above has been described with regard to a QR code, it would be possible to use bar codes or other types of codes which can be scanned and used by the user device 104.

The above described system and method reduces the need for the user to physically interact with the vending machine, and therefore reduces risk of transmission of contagious disease. By reducing the number of mechanical elements such as buttons and touchscreens, maintenance cost and breakdown risks are reduced. Furthermore, since the payment functionality is performed by the purchase processing subsystem, it is easier to reconfigure the vending machine to accept new forms of electronic payments.

In one example embodiment of this disclosure, a system to enable a user to purchase a desired at least one item of one or more items for purchase displayed in a vending machine via a user device comprises a client module installed on the vending machine, wherein the vending machine displays the one or more items for purchase in a first arrangement, and a purchase fulfilment subsystem, wherein: the user device, client module and purchase fulfilment system are coupled to each other via one or more interconnections, a QR code is: dynamically generated by the purchase fulfilment subsystem, transmitted to the client module via the one or more interconnections, and displayed by the client module for scanning by the user device, a first set of signals comprising data to initiate a transaction is: generated by the user device based on the scanning of the QR code, and transmitted by the user device to the purchase fulfilment system via the one or more interconnections, the purchase fulfilment subsystem: receives the transmitted first set of signals, generates, based on the received first set of signals, a second set of signals, and transmits the second set of signals to the user device, the second set of signals comprising data to enable display of a user interface comprising one or more elements in a second arrangement on a display of the user device, and the one or more elements corresponding to the one or more items displayed by the vending machine, the user device, based on an activation of at least one of the one or more elements on the user interface by the user, transmits a third set of signals to the purchase fulfilment subsystem via the one or more interconnections, the third set of signals comprising information related to the activation of the at least one of the one or more elements, the purchase fulfilment subsystem: receives the third set of signals, processes the information related to the activation to produce a fourth set of signals comprising one or more commands to enable the vending machine to dispense the desired at least one item to the user, and transmits the fourth set of signals to the client module over a network, and the client module: receives the fourth set of signals, and based on the one or more commands within the fourth set of signals, sends one or more instructions to the vending machine to perform one or more mechanical movements and thereby enable the desired at least one item to be dispensed to the user.

In one or more of the above examples, the client module prompts the user to obtain an image of a front end of the vending machine using a camera of the user device.

In one or more of the above examples, the first set of signals comprises the obtained image, and the data to enable display of a user interface is generated based on one or more image processing operations performed on the obtained image.

In one or more of the above examples, the second arrangement is: either related to the first arrangement, or created in accordance with one or more of: a purchase history of the user stored in a database of the purchase fulfilment subsystem; or a preference of the user stored in the database of the purchase fulfilment subsystem.

In one or more of the above examples, the second set of signals comprises data to enable display of a payment interface on the display of the user device.

In one or more of the above examples, the client module displays one or more instructions in a first language and the user interface displays one or more instructions in a second language; and the user interface display of the one or more instructions in a second language is based on an auto-translate function.

In one or more of the above examples, the purchase fulfilment subsystem updates an inventory status after the one or more instructions to the vending machine to perform one or more mechanical movements is sent by the client module.

In one or more of the above examples, the purchase fulfilment subsystem transmits an alert to the user device to enable the user to pick up the desired at least one item.

In one or more of the above examples, the client module prompts the user to communicatively couple the user device to an access point on the client module.

In another example embodiment of this disclosure, a method to enable a user to purchase a desired at least one item of one or more items for purchase displayed in a vending machine via a user device comprises displaying, by a client module installed on the vending machine, the one or more items for purchase in a first arrangement; and dynamically generating, by a purchase fulfilment subsystem, a QR code; transmitting, by the purchase fulfilment subsystem, the generated QR code to the client module; displaying, by the client module, the QR code for scanning by the user device; generating, by the user device, a first set of signals based on the scanning of the QR code, wherein the first set of signals comprises data to initiate a transaction; transmitting, by the user device, the first set of signals to the purchase fulfilment subsystem via the one or more interconnections; receiving, by the purchase fulfilment subsystem, the transmitted first set of signals; generating, by the purchase fulfilment subsystem, a second set of signals based on the received first set of signals, wherein: the second set of signals comprises data to enable display of a user interface comprising one or more elements in a second arrangement on a display of the user device, and the one or more elements corresponding to the one or more items displayed by the vending machine; transmitting, by the purchase fulfilment subsystem, the second set of signals to the user device; transmitting, by the user device, a third set of signals to the purchase fulfilment subsystem based on an activation of at least one of the one or more elements on the user interface by the user, the third set of signals comprising information related to the activation of the at least one of the one or more elements; receiving, by the purchase fulfilment subsystem, the third set of signals; processing, by the purchase fulfilment subsystem, the information related to the activation to produce a fourth set of signals comprising one or more commands to enable the vending machine to dispense the desired at least one item to the user; transmitting, by the purchase fulfilment subsystem, the fourth set of signals to the client module; receiving, by the client module, the fourth set of signals; and sending, by the client module, one or more instructions to the vending machine to perform one or more mechanical movements and thereby enable the desired at least one item to be dispensed to the user, the one or more instructions based on the one or more commands within the fourth set of signals.

In one or more of the above examples, the further comprises prompting the user to obtain an image of a front end of the vending machine using a camera of the user device.

In one or more of the above examples, the first set of signals comprises the obtained image, and the method further comprises generating the data to enable display of a user interface based on one or more image processing operations performed on the obtained image.

In one or more of the above examples, the second arrangement is: either related to the first arrangement, or created in accordance with one or more of: a purchase history of the user stored in a database of the purchase fulfilment subsystem, or a preference of the user stored in the database of the purchase fulfilment subsystem.

In one or more of the above examples, the second set of signals comprises data to enable display of a payment interface on the display of the user device.

In one or more of the above examples, the generating of the QR code comprises encoding a first Uniform Resource Locator (URL).

In one or more of the above examples, the dynamically generating occurs periodically.

In one or more of the above examples, the dynamically generating of the QR code comprises enhancing one or more security features.

In one or more of the above examples, the dynamically generating comprises updating the first URL to a second URL.

In another example embodiment of this disclosure, a method to enable a user to purchase a desired at least one item of one or more items for purchase displayed in a vending machine via a user device comprises providing a client module installed on the vending machine, wherein the vending machine displays the one or more items for purchase in a first arrangement; providing a purchase fulfilment subsystem, wherein: the user device, client module and purchase fulfilment system are coupled to each other via one or more interconnections, a dynamically generated QR code is: generated by the purchase fulfilment subsystem, transmitted to the client module via the one or more interconnections, and displayed by the client module for scanning by the user device, a first set of signals is: generated by the user device based on the scanning of the QR code, transmitted by the user device to the purchase fulfilment system via the one or more interconnections, and the first set of signals comprises data to initiate a transaction; the purchase fulfilment subsystem: receives the transmitted first set of signals, generates, based on the received first set of signals, a second set of signals, and transmits the second set of signals to the user device, the second set of signals comprising data to enable display of a user interface comprising one or more elements in a second arrangement on a display of the user device, and the one or more elements corresponding to the one or more items displayed by the vending machine; the user device, based on an activation of at least one of the one or more elements on the user interface by the user, transmits a third set of signals to the purchase fulfilment subsystem via the one or more interconnections, the third set of signals comprising information related to the activation of the at least one of the one or more elements; the purchase fulfilment subsystem: receives the third set of signals, processes the information related to a selection to produce a fourth set of signals comprising one or more commands to enable the vending machine to dispense the desired at least one item to the user, and transmits the fourth set of signals to the client module over a network; and the client module: receives the fourth set of signals, and based on the one or more commands within the fourth set of signals, sends one or more instructions to the vending machine to perform one or more mechanical movements and thereby enable the desired at least one item to be dispensed to the user.

Although the algorithms described above including those with reference to the foregoing flow charts have been described separately, it should be understood that any two or more of the algorithms disclosed herein can be combined in any combination. Any of the methods, algorithms, implementations, or procedures described herein can include machine-readable instructions for execution by: (a) a processor, (b) a controller, and/or (c) any other suitable processing device. Any algorithm, software, or method disclosed herein can be embodied in software stored on a non-transitory tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well known manner (e.g., it may be implemented by an application specific integrated circuit (ASIC), a programmable logic device (PLD), a field programmable logic device (FPLD), discrete logic, etc.). Also, some or all of the machine-readable instructions represented in any flowchart depicted herein can be implemented manually as opposed to automatically by a controller, processor, or similar computing device or machine. Further, although specific algorithms are described with reference to flowcharts depicted herein, persons of ordinary skill in the art will readily appreciate that many other methods of implementing the example machine readable instructions may alternatively be used. For example, the order of execution of the blocks may be changed, and/or some of the blocks described may be changed, eliminated, or combined.

It should be noted that the algorithms illustrated and discussed herein as having various modules which perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a non-transitory computer-readable medium as above as modules in any manner, and can be used separately or in combination.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of an invention as defined in the appended claims.

What is claimed is:

1. A system to enable a user to purchase a desired at least one item of one or more items for purchase displayed in a vending machine via a user device, the system comprising:
   a client module installed on the vending machine, wherein the vending machine displays the one or more items for purchase in a first arrangement; and
   a purchase fulfilment subsystem, wherein:
      the user device, client module and purchase fulfilment subsystem are coupled to each other via one or more interconnections,
      a QR code is:
         dynamically generated by the purchase fulfilment subsystem,
         transmitted to the client module via the one or more interconnections, and
         displayed by the client module for scanning by the user device,
      a first set of signals comprising data to initiate a transaction is:
         generated by the user device based on the scanning of the QR code, and
         transmitted by the user device to the purchase fulfilment subsystem via the one or more interconnections,
      the purchase fulfilment subsystem:
         receives the transmitted first set of signals,
         generates, based on the received first set of signals, a second set of signals, and
         transmits the second set of signals to the user device, the second set of signals comprising data to enable display of a user interface comprising one or more elements in a second arrangement, different from the first arrangement, on a display of the user device, the one or more elements corresponding to the one or more items displayed by the vending machine, and the second arrangement is generated by the purchase fulfillment subsystem in accordance with one or more of: a purchase history of the user stored in a database of the purchase fulfilment subsystem, a preference of the user stored in the database of the purchase fulfilment subsystem, or a combination thereof,
      the user device, based on an activation of at least one of the one or more elements on the user interface by the user, transmits a third set of signals to the purchase fulfilment subsystem via the one or more interconnections, the third set of signals comprising information related to the activation of the at least one of the one or more elements,
      the purchase fulfilment subsystem:
         receives the third set of signals,
         processes the information related to the activation to produce a fourth set of signals comprising one or more commands to enable the vending machine to dispense the at least one item to the user, and
         transmits the fourth set of signals to the client module over a network, and the client module:
         receives the fourth set of signals, and
         based on the one or more commands within the fourth set of signals, sends one or more instructions to the vending machine to perform one or more mechanical movements and thereby enable the desired at least one item to be dispensed to the user.

2. The system of claim 1, wherein the client module prompts the user to obtain an image of a front end of the vending machine using a camera of the user device.

3. The system of claim 2, wherein:
   the first set of signals comprises the obtained image, and
   the data to enable display of a user interface is generated based on one or more image processing operations performed on the obtained image.

4. The system of claim 1, wherein the second set of signals comprises data to enable display of a payment interface on the display of the user device.

5. The system of claim 1, wherein:
   the client module displays one or more instructions in a first language and the user interface displays one or more instructions in a second language; and
   the user interface display of the one or more instructions in a second language is based on an auto-translate function.

6. The system of claim 1, wherein the purchase fulfilment subsystem updates an inventory status after the one or more instructions to the vending machine to perform one or more mechanical movements is sent by the client module.

7. The system of claim 1, wherein the purchase fulfilment subsystem transmits an alert to the user device to enable the user to pick up the desired at least one item.

8. The system of claim 1, further wherein the client module prompts the user to communicatively couple the user device to an access point on the client module.

9. A method to enable a user to purchase a desired at least one item of one or more items for purchase displayed in a vending machine via a user device, the method comprising:
   displaying, by a client module installed on the vending machine, the one or more items for purchase in a first arrangement; and
   dynamically generating, by a purchase fulfilment subsystem, a QR code;
   transmitting, by the purchase fulfilment subsystem, the generated QR code to the client module;
   displaying, by the client module, the QR code for scanning by the user device;

generating, by the user device, a first set of signals based on the scanning of the QR code, wherein the first set of signals comprises data to initiate a transaction;

transmitting, by the user device, the first set of signals to the purchase fulfilment subsystem via the one or more interconnections;

receiving, by the purchase fulfilment subsystem, the transmitted first set of signals;

generating, by the purchase fulfilment subsystem, a second set of signals based on the received first set of signals, wherein:
the second set of signals comprises data to enable display of a user interface comprising one or more elements in a second arrangement, different form the first arrangement, on a display of the user device,
the one or more elements corresponding to the one or more items displayed by the vending machine, and
the second arrangement is generated by the purchase fulfilment subsystem in accordance with one or more of: a purchase history of the user stored in a database of the purchase fulfilment subsystem, a preference of the user stored in the database of the purchase fulfilment subsystem, or a combination thereof;

transmitting, by the purchase fulfilment subsystem, the second set of signals to the user device;

transmitting, by the user device, a third set of signals to the purchase fulfilment subsystem based on an activation of at least one of the one or more elements on the user interface by the user, the third set of signals comprising information related to the activation of the at least one of the one or more elements;

receiving, by the purchase fulfilment subsystem, the third set of signals;

processing, by the purchase fulfilment subsystem, the information related to the activation to produce a fourth set of signals comprising one or more commands to enable the vending machine to dispense the desired at least one item to the user;

transmitting, by the purchase fulfilment subsystem, the fourth set of signals to the client module;

receiving, by the client module, the fourth set of signals; and sending, by the client module, one or more instructions to the vending machine to perform one or more mechanical movements and thereby enable the desired at least one item to be dispensed to the user, the one or more instructions based on the one or more commands within the fourth set of signals.

10. The method of claim 9, further comprising prompting the user to obtain an image of a front end of the vending machine using a camera of the user device.

11. The method of claim 10, wherein:
the first set of signals comprises the obtained image, and
the method further comprises generating the data to enable display of a user interface based on one or more image processing operations performed on the obtained image.

12. The method of claim 9, wherein the second set of signals comprises data to enable display of a payment interface on the display of the user device.

13. The method of claim 9, wherein the generating of the QR code comprises encoding a first Uniform Resource Locator (URL).

14. The method of claim 13, wherein the dynamically generating occurs periodically.

15. The method of claim 13, wherein the dynamically generating of the QR code comprises enhancing one or more security features.

16. The method of claim 13, wherein the dynamically generating comprises updating the first URL to a second URL.

17. A method to enable a user to purchase a desired at least one item of one or more items for purchase displayed in a vending machine via a user device, the method comprising:
providing a client module installed on the vending machine, wherein the vending machine displays the one or more items for purchase in a first arrangement;
providing a purchase fulfilment subsystem, wherein:
the user device, client module and purchase fulfilment subsystem are coupled to each other via one or more interconnections,
a dynamically generated QR code is:
generated by the purchase fulfilment subsystem,
transmitted to the client module via the one or more interconnections, and
displayed by the client module for scanning by the user device,
a first set of signals is:
generated by the user device based on the scanning of the QR code,
transmitted by the user device to the purchase fulfilment subsystem via the one or more interconnections, and
the first set of signals comprises data to initiate a transaction;
the purchase fulfilment subsystem:
receives the transmitted first set of signals,
generates, based on the received first set of signals, a second set of signals, and
transmits the second set of signals to the user device, the second set of signals comprising data to enable display of a user interface comprising one or more elements in a second arrangement, different from the first arrangement, on a display of the user device, the one or more elements corresponding to the one or more items displayed by the vending machine, and the second arrangement is generated by the purchase fulfillment subsystem in accordance with one or more of: a purchase history of the user stored in a database of the purchase fulfilment subsystem, a preference of the user stored in the database of the purchase fulfilment subsystem, or a combination thereof;
the user device, based on an activation of at least one of the one or more elements on the user interface by the user, transmits a third set of signals to the purchase fulfilment subsystem via the one or more interconnections, the third set of signals comprising information related to the activation of the at least one of the one or more elements;
the purchase fulfilment subsystem:
receives the third set of signals,
processes the information related to a selection to produce a fourth set of signals comprising one or more commands to enable the vending machine to dispense the desired at least one item to the user, and transmits the fourth set of signals to the client module over a network; and
the client module:
receives the fourth set of signals, and
based on the one or more commands within the fourth set of signals, sends one or more instructions to the vending machine to perform one or more mechanical movements and thereby enable the desired at least one item to be dispensed to the user.

18. The system of claim 1, wherein the purchase fulfilment subsystem receives, from the user device, a fifth set of signals after the third set of signals and before producing the fourth set of signals, the fifth set of signals comprising a user selection of a third party payment processor, and the purchase fulfilment subsystem further comprises: responsive to receipt of the fifth set of signals, using a communications subsystem to interact with a remote payment processing system to obtain payment for the at least one of the one or more elements.

* * * * *